Aug. 6, 1935.  J. ARCHBOLD ET AL  2,010,797
ROTARY ENGINE
Filed Jan. 7, 1931  3 Sheets-Sheet 1

Patented Aug. 6, 1935

2,010,797

UNITED STATES PATENT OFFICE 2,010,797

ROTARY ENGINE

John Archbold, Washington, D. C., and Charles Parker, Bar Harbor, Maine; said Parker assignor to said Archbold Application January 7, 1931, Serial No. 507,262

36 Claims. (Cl. 123—13)

This invention relates to rotary internal combustion engines and particularly to that type which are officially classified as rotary internal combustion engines, rotary abutment; though some of the improvements herein described might be applied to rotary engines of other classes, and to other organizations of the rotary type, such as motors, pumps or the like.

The general objects of the invention are—

First, to produce a rotary engine of the type specified wherein reciprocating parts are dispensed with altogether, resulting in simplicity of design and a minimum number of moving parts, all of which are rotary, with the consequent advantages of compactness, relatively low cost of construction and relatively high efficiency;

Second, to produce an engine of the type specified wherein high power is obtained in a smooth continuous manner and at relatively low speed of operation, resulting in reliability and relative economy of operation;

Third, to produce an engine of the type specified wherein the rotary abutments constitute in effect a continuous solid wall in relation to the piston members;

Fourth, to produce a rotary engine so designed that the force of the explosions takes effect at the point that yields maximum efficiency;

Fifth, to produce an engine of the type specified wherein both sides of all the moving parts—piston members and abutments—are utilized continuously;

Sixth, to produce an engine of the type specified wherein the entire periphery of the rotor is utilized at all times;

Seventh, to produce an engine of the type specified having a greater range of effective working pressure than can be obtained in engines of other types having practically the same brake horse power.

The more specific objects of the invention are—

(1) To produce a rotary engine of the type specified wherein the members which perform the office of pistons have the form of radial vanes obliquely disposed at suitable distances apart on the rim of the rotor, and wherein the abutments have the form of rings, which may be, for example, annular flanges at the edges of rotary disks or wheels, which flanges constitute the abutment walls, the same being provided with apertures at suitable distances apart for the passage of said vanes, the parts being so shaped and proportioned that while a vane is passing through an aperture a fluid-tight joint is formed;

(2) To produce, by means of the above specified oblique arrangement of vanes and the corresponding passageways through the abutment flange, an abutment such that, though in constant rotary motion, it is always in position (being practically a continuous annular wall) instead of one that is moved into and out of position intermittently;

(3) To utilize to a maximum degree the peripheral capacity of the rotor by combining therewith a duplicate set of abutments;

(4) To mount the abutments in tangential relation to the rotor, whereby the abutment wall is in position to present the maximum resistance to the shock of explosions;

(5) To produce a rotary internal combustion engine in which the abutments are geared directly to the rotor and are enclosed within the stator, which, among other advantages, ensures perfect timing of the correlated parts and general accuracy of operation;

(6) To produce an engine of the type specified having a system of ports of very simple design;

(7) To produce an engine of the specified type wherein are no valves or similar moving parts, and in which none of the major operations depend upon the action of springs;

(8) To produce an engine of the specified type wherein the phases of intake and exhaust are practically uninterrupted.

The invention and the above stated other objects realized thereby will be better understood from the following description in connection with the accompanying drawings illustrating the preferred embodiment of the invention, in which drawings—

Figures 3, 4, 9, 10:
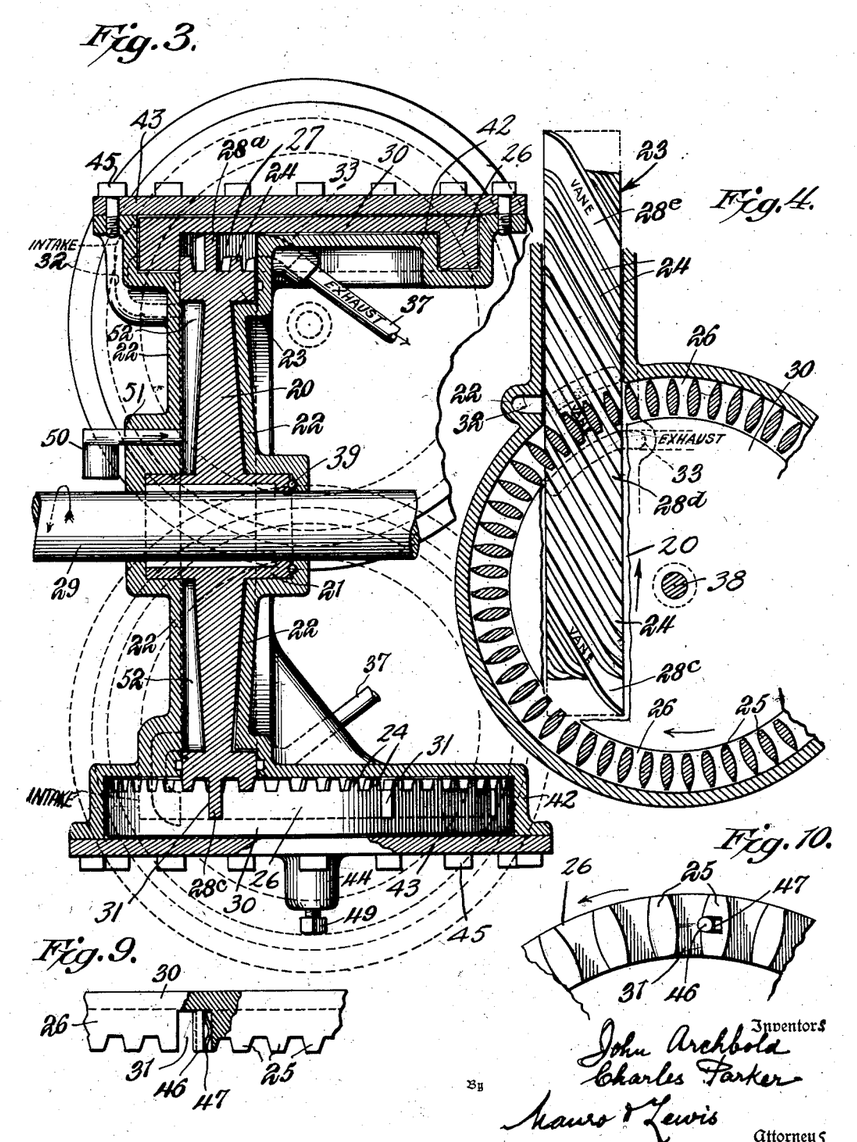
Fig. 3 is a transverse section substantially on line 3—3 of Fig. 2.
Fig. 4 is a sectional view on line 4—4 of Fig. 2, but with the parts in relative positions different from those they occupy as shown in Fig. 2.
Figs. 9 and 10 are detail views on an enlarged scale showing parts of one of the abutments.

The main parts or elements of the engine are the rotor, the stator and the rotary abutments. The rotor is constituted by a wheel 20 keyed on a shaft 29 and having a hub 21, the opposite projecting ends of said hub being journalled respectively in recesses in the side walls 22 of the casing or stator member (Fig. 3). Said stator member 40 is of generally circular form viewed from the front (Fig. 1) and is supported on a suitable base 41, the form and character of which will depend upon the use to which the engine is to be put and the conditions in which it is to be employed.

Figure 2:
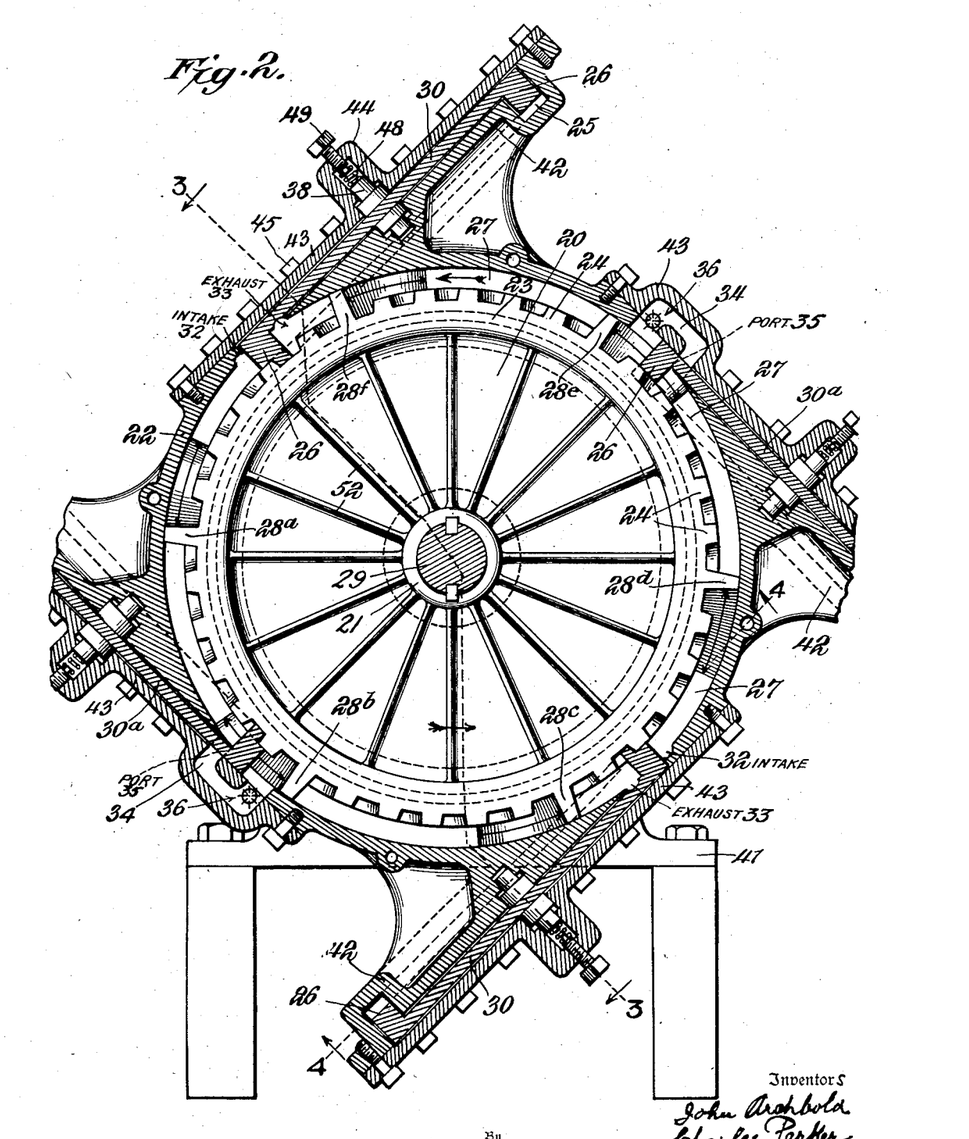
Fig. 2 is a view in vertical section on a larger scale showing the front face of the rotor in elevation.

The circular part of stator 40, which contains the rotor 20 is of a diameter somewhat greater than that of the latter so that an annular space 27 is formed between the rim 23 of the rotor and the adjacent concave surface of the stator (Fig. 2). Said rotor has a series of radial vanes 28a 28b, 28c, 28d, 28e, 28f, which extend obliquely across the rim 23 thereof and are of such height that their upper curved edges are flush with the concave surface of the chamber within which the rotor is housed. These vanes serve therefore to divide the annular space 27 into a series of compartments, which constitute peripheral chambers travelling with the rotor. The explosions take place in these chambers, the vanes performing the function of pistons. Because of the obliquity of vanes 28 the peripheral chambers are of rhomboidal form; that is, successive chambers partly overlap or lie side by side. The importance of this arrangement will be explained hereafter.

Cooperating with the rotor and geared directly thereto are the abutments. As shown, the abutments proper are in the form of rings 26, which, in the embodiment illustrated in the drawings, constitute flanges at the rims of the several disks 30. Said rings or flanges 26 are of relatively little height (Fig. 2), but of considerable thickness, the object being to withstand the shock of the explosions, and also (and principally) to make a tight joint entirely across the rim of the rotor where the flange is crossing the latter. In the embodiment of the invention shown in the drawings, there are four abutment disks and there is advantage in having four or more, although there need be only two.

The rim of rotor 20 is provided with obliquely disposed gear teeth 24. These are parallel with the vanes 28, which also perform the function of gear teeth. The edges of the abutment rings or flanges 26 have gear teeth 25 for engagement with teeth 24 on rotor 20, and have also apertures 31 at intervals corresponding to vanes 28 on the rotor. These apertures 31 extend the full height of flange 26 (Fig. 9) and are of such shape that a vane 28 in engaging and passing through one of them fills it completely, forming therewith a fluid-tight joint. The importance of this feature of construction will appear later on. Just as each vane 28 occupies the place and performs the function of one of the teeth 24, in addition to its own proper function, so likewise each aperture 31 occupies the place of a space between adjacent teeth 25 on the abutment flange, being merely of greater height. The teeth 24, 25 are of the character of spiral gearing and the dimensions and shape thereof are matters within the skill of the expert gear cutter.

It will be seen that the axes of the abutment wheels 30 are not in the plane of the rotor, but are offset with reference thereto as clearly shown in Figs. 2, 3 and 4. The extent of this displacement depends upon two things: First, the degree of obliquity of the vanes 28 and teeth 24 on the rim of the rotor, and second, the size of the abutment wheels relative to that of the rotor. It is preferred to arrange vanes 28 and teeth 24 at an angle of forty-five degrees with the plane of rotation of the rotor, and (for a reason stated below) to make the abutment disks of a size relative to the rotor (in diameter) as five to six. These being the structural conditions, the abutment disks will be so located that the intersection of their flanges 26 with the plane of rotation of the rotor 20 will be at right angles with the vanes 28 and teeth 24 (see Fig. 4).

It will also be seen that teeth 25 have sides that are slightly convex, giving them an oval contour (Fig. 4). The reason is that teeth 24 and vanes 28 in passing between adjacent teeth 25 do not follow a straight line parallel to the latter but tilt a little, so to speak, first one way and then the other. The curvature of the sides of teeth 25 is such as to allow for this tilt or change of direction and to maintain contact between the intermeshing teeth 24 and 25; and what is of even more importance it permits vanes 28 to make a close fit, and hence a tight joint, with the corresponding apertures 31 in the abutment flanges 26.

In the preferred embodiment of the invention there are five apertures or passageways 31 in each abutment flange, whereas there are six vanes 28 on the rotor, the relative arrangement and timing of the parts being such that each vane uses the five passageways successively in rotation, thereby distributing the wear with approximate equality. It is for this purpose that the abutment disks are given, as stated above, a size (in diameter) relative to that of the rotor as five is to six.

The rotor and the abutment disks comprise all the moving parts of the engine; so that, in the embodiment illustrated in the drawings, there are—disregarding several minor details hereafter described—but five moving parts in all. It would be possible, however, as stated above, to embody the invention in an engine having but two abutment disks; and there might be, of course, a larger number than four.

There is an advantage also in having six vanes. This will be evident as the explanation proceeds; but the number may be greater or less than six.

Because of the obliquity of vanes 28 the explosions exert a lateral pressure on the rotor wheel 20, the direction of this pressure being from left to right of the plane of rotation of the rotor. To oppose the effect of this lateral pressure it is deemed advantageous to provide thrust bearings, preferably in the form of anti-friction balls 39 (Fig. 3) between the right hand end of hub 21 of the rotor and the adjacent wall 22 of the stator.

The abutment wheels 30 are contained in housings of corresponding shape forming parts of the stator element. Each housing comprises a dish-shaped member 42, which may be integral with casing 40 of the stator, and a cover member 43 attached to member 42 as by bolts 45. Member 43 has a central boss 44 having a recess which forms one of the bearings for the hub 38 of the abutment wheel (Fig. 2), the other bearing thereof being in a correspondingly located recess in member 42.

Boss 44 also contains a compression spring 48 which causes the flange 26 of abutment wheel 30 to bear with yielding pressure against the rim 23 of the rotor, forming a fluid-tight joint. The pressure of spring 48 can be regulated by means of screw 49.

The abutment wheels 30 are preferably so mounted that their planes of rotation are approximately tangential to rotor wheel 20.

Figures 1, 5, 6, 7, 8:
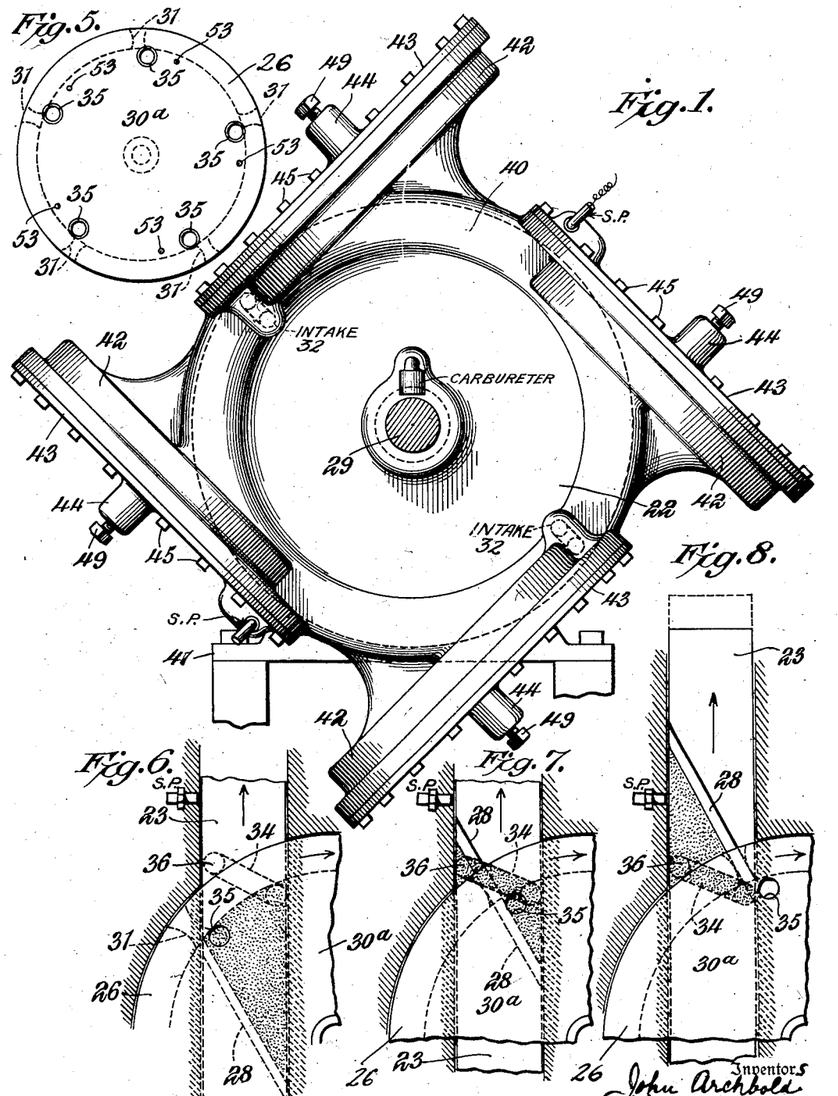
Fig. 1 is a front elevation.
Fig. 5 is a top side view on a smaller scale of one of the two rotary abutments that are located at the explosion points.
Figs. 6, 7 and 8 are diagrammatic views illustrating different relative positions, respectively, of the rotor and one of the abutments shown in Fig. 5.

Of the four abutment wheels whose positions are indicated in Figs. 1 and 2, two perform duty in connection with the intake and the exhaust of the gaseous charge. These are the abutments 30 (Fig. 2) one at the upper left hand corner of the sheet, the other diametrically opposite. These are termed herein the "intake and exhaust" abutments. The other two perform duty in connection with the compression and the expansion of the charge, these being the abutments 30a. They are termed herein the "compression and expansion" abutments. The explosions take place at these compression and expansion abutments, between the compression and the expansion of the charge.

In the working of the engine the complete cycle of operations comprises five that are essential, namely: (1) the intake of the charge; (2) the compression thereof; (3) the transfer thereof; (4) the explosion and expansion; (5) the exhaust.

In the embodiment of the invention shown in the drawings this complete cycle of operations takes place twice for each of the six vanes 28 in each revolution of the rotor 20, certain of the cooperating parts being duplicated, as for example the abutment disks.

Further it is to be noted that each of the specified operations takes place always in the same sector of the stator member.

In the embodiment of the invention illustrated by way of example in the drawings, the five specified operations which constitute a cycle—intake, compression, transfer, explosion and exhaust—take place in the following manner:

Immediately following the intake, the compression of the charge takes place in a peripheral chamber of the rotor between one of the piston vanes and one side (in this embodiment of the invention, the concave side) of the ring or flange 26 of one of the abutment disks 30a (Fig. 6). When the port 35 in said disk comes into registration with one end of the transfer passage 34 in the stator member (Fig. 7) the transfer operation begins, and it continues until the parts reach the positions shown in Fig. 8. Explosion of the compressed charge, which has been transferred to the opposite side of the piston vane 28 and to the convex side of the flange 26 of disk 30a, takes place at the spark plug S. P.; and the exhaust of the products of combustion takes place at port 33 of the next abutment 30. These successive operations, which form a complete cycle, will be described more in detail hereafter.

In the course of a cycle of the five main operations specified above, the transfer of the charge from the fore side of a vane 28 to the rear thereof, and from the concave to the convex side of an abutment flange, takes place between the compression and the explosion of the charge. There are features connected with this transfer of the charge that call for special attention, as will be seen later on.

The duplication of the cooperating parts, that is to say the fact that there are identical operations simultaneously taking place at diametrically opposite points of the rotor, has important advantages and conduces to the accomplishment of certain of the objects of the invention set forth above; but it is not an essential feature thereof.

It should be observed in this connection that the described operations constituting a complete cycle do not follow each other in strict sequence, one beginning sharply where the next preceding ends (as for example in the case of the well known Otto gas engine) but on the contrary they overlap, as will be presently explained. This too has important advantages, specially in that it permits the continuous utilization of both sides of the several vanes or piston members and of both sides of the abutment rings or flanges. This conduces to compactness, reliability, efficiency, smoothness of operation, and increase of relative power.

In Fig. 4 three of the vanes or piston members are seen—28c the lowermost, then 28d next above, and 28e near the top. Of these, the middle one, 28d, is in the act of passing through the aperture provided for that purpose in flange 26 of abutment wheel 30 (this being one of the pair of "intake and exhaust" abutments). The intake port 32 is seen in the stator wall 22 adjacent to the periphery of the abutment wheel 30. The form of that port and the means for supplying the explosive charge thereto will be explained hereafter. At this point we are concerned only with the cycles of operations that take place in the peripheral chambers of the rotor.

It will be seen from Figs. 3 and 4 that the exhaust port 33 is in the stator wall adjacent to the concave side of the abutment flange 26, and that it communicates with a discharge pipe 37. No valves or other devices are employed in connection with either the intake or the discharge operations.

At the time that vane 28d is just beginning (as in Fig. 4) to draw in behind it a fresh charge through intake 32, it is still pushing out before it through exhaust port 33 the gaseous products of the last preceding explosion.

The positions of ports 32 and 33 relative to each other and to the abutment wheels being noted, it will be seen from Fig. 4 that the peripheral chamber or compartment between vane 28d and vane 28e has nearly finished the operation of drawing in by suction a fresh charge of explosive mixture through intake port 32. What calls for special notice is that, in this position of the moving parts, said chamber is divided by the flange 26 of abutment wheel 30 into two parts, and that, in that position of the parts, vane 28d is in the act of passing through one of the apertures in said flange. Further it will be seen that the said abutment flange not only divides the compartment or peripheral chamber in front of vane 28d into two parts, but it also divides in like manner the compartment or chamber in the rear thereof. The practical effect is that the part or division of the first mentioned chamber which is on the convex side of flange 26 is already filled with a fresh charge, while that part or division thereof which is on the concave side of said flange is still discharging through exhaust port 33 the products of the last preceding explosion. Furthermore, in the compartment to the rear of vane 28d, the part or division thereof which is on the convex side of abutment flange 26 has already come into communication with the intake 32, whereas the main portion thereof (that on the concave side of the abutment flange 26) is in communication with the exhaust port.

In order to meet these conditions it is necessary that the intake port 32 should be in communication with the annular space 27 entirely across the rim of the rotor wheel, as indicated by dotted lines in Fig. 4, said intake port being in the form of a shallow groove in the inner surface of member 43 of the abutment housing, as indicated in Fig. 2, which groove extends entirely across rim 23 of rotor wheel 20. For it will be understood that the abutment flange constitutes a gas tight barrier between intake and exhaust ports.

Further it should be noted in this connection that, because of the obliquity of vanes 28 and of the relative positions of the intake and exhaust ports, as pointed out above, each compartment in its turn begins the intake of a fresh charge before the compartment next ahead of it has finished discharging the products of explosion of its last preceding charge. This partly explains the statement made above that the several phases of the cycle of operations do not follow each other in strict sequence, but overlap. This is true in respect to operations other than the intake and exhaust.

Attention has been specially called to the fact that the annular space 27 at the periphery of the rotor in which the described cycles of operations take place, besides being divided into compartments or chambers by the oblique vanes 28, is divided also by the four abutment rings 26. There is, however, an important difference in that, whereas the vanes travel with the rotor, the rings 26 constitute partitions that are stationary relatively to the rotor. It will also be seen by reference to Fig. 4 that, as already stated, the two sets of partitions—vanes 28 and rings 26—intersect practically at right angles to each other.

These arrangements and relative positions of the moving parts conduce to the accomplishment of the important objects of high efficiency, smoothness of operation and the utilization of both sides of vanes 28 and of rings 26.

Having described the intake and exhaust operations which take place at abutments 30, we will now observe what takes place at the compression and expansion abutments 30a.

During the intake and exhaust operations described above, vane 28e, which constitutes the front wall of one of the two compartments under consideration, has been compressing before it against the concave side of ring 26 of abutment 30a the charge taken in at inlet port 32, and the next operation is the transfer of the compressed charge from the chamber in front of said vane 28e to that in the rear thereof and from the concave side of said ring 26 of abutment 30a to the convex side thereof; for obviously the explosions must take place on the rear of the piston-members 28 and on the convex sides of the relatively fixed abutment flanges 26, which serve the purpose of the cylinder heads of reciprocating engines. This operation and the preferred means of its accomplishment will now be described, attention being specially called to the fact that, by reason of the relative positions of the moving parts and of the coordination and timing of their respective movements, the transfer of the compressed charge from front to rear of vane 28e (and of each vane in its turn) accomplishes also the transfer of said charge from the concave to the convex side of the cooperating abutment ring 26.

It will be noted also that the transfer of the charge from front to rear of the vane is accomplished—not by a movement in a backward direction, as the terms "front" and "rear" suggest, but by a movement sidewise with respect to the rotor, advantage being taken of the fact that, owing to the obliquity of vanes 28, the forward part of each peripheral chamber overlaps, and hence is in advance of, the rear part of the chamber next in front of it. In fact the direction of the transfer, notwithstanding it is from one peripheral chamber to that immediately in the rear thereof, is slightly forward with respect to the movement of the rotor, rather than backward.

The transfer of the compressed charge takes place through suitably formed and located by-pass channels such as channel 34, which may be formed in the stator, as shown in Fig. 2. This transfer operation can be best explained by reference to Figs. 6, 7 and 8, in which the position of the by-pass 34 is indicated diagrammatically, it being understood that said by-pass in this case lies over the abutment ring or flange 26 (Fig. 2).

The compression and expansion abutments 30a, one of which is shown on a reduced scale in Fig. 5, differ from the intake and exhaust abutments in that they (the former) have a series of ports 35 in the disk portion thereof, there being, in the construction illustrated in the drawings, five of these transfer ports, one in proximity to each of the apertures or passage-ways 31 through the flange 26. The transfer ports 35 are so located with respect to the axis of the abutment wheel that during the revolution of the latter they register successively with the admission end of by-pass channels 34 (see also Fig. 2).

In the positions of the several parts shown in Fig. 6 a vane 28 is just entering a passage-way 31 through the ring or flange of an abutment 30a, at which time the corresponding port 35 has some little distance to go before it registers with the admission end of by-pass 34. It is specially to be noted that this vane 28 in its advance has been crowding the gaseous charge (represented in these diagrams by a stippled surface) against the relatively stationary flange 26 of the abutment. As this compression of the gaseous charge continues, the volumetric capacity of the space between vane 28 and ring or flange 26 becomes less and less and the degree of compression becomes correspondingly greater and greater, until the movements of rotor 20 and of abutment 30a bring the parts into the positions shown in Fig. 7, where port 35 is just coming into registration with by-pass 34. By this time the triangular space into which the vane 28 has been crowding the gaseous charge has been diminished to a very small cubical capacity. Hence the charge has become highly compressed and combustible, and by the time the communication between port 35 and by-pass 34 has been cut off, that is, when the parts have come into the positions indicated in Fig. 8, the entire charge will have been expelled through said by-pass into the triangular space on the other side of said vane, between it and the convex side of abutment ring 26, which space has been increasing as to volumetric capacity proportionately to the decrease therein of the space on the other side of said ring.

Fig. 6 shows the gaseous charge entirely on the concave side of the abutment flange 26; Fig. 7 shows it as being still for the greater part on the concave side, but as partly on the convex side of said flange; and Fig. 8 shows it as being wholly on the convex side, which is the front or explosion side of the abutment. It will be seen that, owing to the relative positions of the moving parts, the transfer of the gaseous charge, notwithstanding it is from the front to the rear side of vane 28, is from the rear to the front of abutment flange.

The location of the spark plug or other suitable ignition device is indicated at 36, it being placed near the exit of by-pass channel 34, so that the explosion takes place at the end of the compression stage and the beginning of the expansion stage of the cycle of operations.

From the foregoing description it will be clearly understood how the compressed charge is transferred from the rear or concave side of the relatively stationary explosion abutment 30a to the front or convex side thereof without the use of any valves, impellers or other special devices, this important operation being effected solely by the particular configuration, relative positions and co-ordination of the rotor and the explosion abutment, and without supplying any additional parts or imparting any extra movements to the existing parts. We have already seen how the intake and exhaust operations are likewise accomplished without the use of any valves or other special members.

It will be observed that the by-pass 34, being in the cover member 43, which is part of the stator, is in a fixed location, whereas the abutment flange 26, which it straddles at all times, so that the flange has a compression side and an explosion side, has a continuous rotary motion but is stationary relatively to the rotor and its peripheral vanes 28; and further that at the instant of the transfer of a charge through the by-pass 34 the latter bestrides not only the flange 26 of the abutment but also one of the vanes 28. For a vane 28 is at that time in the act of passing through one of the apertures 31 in flange 26. In so doing the vane 28 is performing the necessary function of plugging that aperture thereby preventing the passage of gas through the same. For, as shown in Fig. 6, vane 28 has begun to enter aperture 31 before the latter comes into communication with the space on the explosion side of abutment flange 26. By the time that communication is established vane 28 has completely plugged said aperture, and before the vane has passed entirely through said aperture the rear end of the latter will have passed out of communication with the peripheral chamber on the compression side of vane 28 and of flange 26. Thus the abutment flange, although it has passage-ways for the vanes 28, nevertheless presents always an impassable barrier to the gaseous charge; and this is accomplished without the addition of any special devices and without imparting additional motions to the members that are essential for other operations. The very act of passing the vanes through the passage-ways 31 in the abutment flanges is what makes the latter impassable for the gases.

The transfer ports 35 are represented as being of circular shape in cross section, but they may be of oblong, triangular or other shape, and their size will obviously depend upon conditions that are variable.

The intake and exhaust abutments 30 are in all respects like the compression and expansion abutments 30a, shown in Fig. 5, except that they have no ports corresponding to the ports 35 of the latter. The intake and exhaust operations at abutments 30 correspond in a way to the compression and expansion operations at abutments 30a.

As shown in Fig. 5 the abutments 30a have a series of supplemental ports 53 of relatively small diameter which register in turn with the by-pass channel 34 in advance of the registry therewith of the main ports 35, the purpose being, by a sudden puff of a very small jet of compressed gas, to clear the by-pass channel of all products of the last preceding explosion; in other words, to scavenge these by-pass channels, by driving the left over gases into the exhaust.

In Figs. 9 and 10 is illustrated a sealing device which may be used for the purpose of insuring a tight joint between a vane 28 and the flange 26 of an abutment while the vane is passing through an aperture 31 in the flange. The device as shown consists of a spring-pressed member in the form of a pin 46 having a curved contour (though not necessarily cylindrical) set loosely in a socket in the flange 26 which socket has a narrow slot the full length thereof opening into the aperture 31. The curved surface of the sealing device 46 projects slightly through this opening into said aperture, being held in place with yielding pressure by spring 47. Thus while a vane is passing through aperture 31 a close fit is insured.

The intake of the gaseous charge will now be described more in detail, referring specially to Figs. 2 and 3, in which the preferred construction of the means utilized for that purpose is illustrated. As shown in Fig. 3, there is a space 52 between one of the side walls 22 of the stator (that on the left hand side thereof) and the adjacent face of the rotor wheel 20. Supported on the casing near the rotor shaft 29 is a carburetor 50 of any known and suitable construction whereby, through a passage 51 in wall 22, an explosive mixture of any known and suitable kind is introduced into said space 52 and is sprayed against the face of rotor 20, being thereby pre-heated and brought to a high degree of atomization. The face of the rotor is provided with a series of radially disposed blades 52 which constitute in effect a super-charger.

As indicated by the arrows in Fig. 3 the gaseous charge passes from carburetor 50 to the two intake ports 32 and through these to the two peripheral chambers of the rotor which at the moment are in the intake and exhaust sectors of the stator and in communication with the respective inlet ports.

The rest of the intake operation has been sufficiently described above.

It is obvious that other means for supplying the engine with charges of a suitable explosive mixture may be used in lieu of the devices described.

It is deemed to be an important feature of the invention that the abutment wheels are geared directly to, and hence are driven directly by, the rotor wheel, the result being that not only is the number of working parts kept at a minimum but greater accuracy and certainty of operation are insured, in that the possibility of mis-timing is eliminated. A further advantage is that the gearing is all enclosed in the stator and thereby protected from accident and disarrangement.

Furthermore, the form of the abutments and the direct gearing thereof to the rotor make the lubrication of those parts a comparatively simple matter.

It will be seen that the explosions take place at the periphery of the rotor where the maximum effect thereof is obtained. Moreover, the form and position of the abutments are such that they offer the maximum resistance to the shock and pressure of the explosions. For these take place on the convex face of the abutment in a direction that is normal thereto and that is at right angles to the plane of the disk or flat part of the abutment, that being the line in which that part of the abutment offers the greatest resistance.

It will be noted that, in the embodiment of the present invention herein described and illustrated in the accompanying drawings, the advantage of the rotary principle is realized in a high degree. Thus, in comparison with the so-called "four-cycle" reciprocating engine, whereas the latter requires two complete strokes of the piston, forward and back, and two revolutions of the crank shaft, to accomplish the four operations of intake, compression, expansion and exhaust, in the engine herein described each of the six vanes or piston-members takes part twice during a single revolution of the rotor shaft in all the five operations above described as constituting a complete cycle. This comparison indicates that, other things being equal, there is an advantage of twenty-four to one in favor of the engine herein described.

Furthermore, whereas in the reciprocating engine the power developed by the explosions is communicated to the crank shaft at a point close to its axis, in the engine herein described the power is communicated to the rotor shaft at a point relatively more distant by several times from its axis, and hence with a leverage proportionately greater. The herein described rotary engine has therefore a far greater range of available and effective working pressure than is obtainable in engines of other types having practically the same brake horse power.

It will be understood that the foregoing description embraces matters which are not essential to the invention but are given by way of preference or of example only, and hence modifications may be made in details of construction without departure from the essence of the invention as specified in the following claims.

In the following claims the term "rotary engine" is to be understood as embracing any and every sort of a rotary organization wherein the features of the invention specified could be used.

What is claimed as new is—

1. The combination with the stator, of the rotor mounted for rotation therein having a series of peripheral chambers separated from one another by obliquely disposed vanes, a plurality of rotary annular abutments located around said rotor and geared thereto, said abutments being provided with apertures properly located and shaped for the passage of said vanes, one abutment being located between an inlet and an exhaust port in said stator, and another abutment being adjacent to a by-pass channel whereby the gaseous charge is transferred from one peripheral chamber to another and from one side to the other of an abutment.

2. The combination with the stator, of the rotor mounted for rotation therein having a series of peripheral chambers separated from one another by obliquely disposed vanes, a plurality of rotary annular abutments located around said rotor and geared thereto, said abutments being provided with apertures properly located and shaped for the passage of said vanes, one abutment being located between an inlet and an exhaust port in said stator, and another being adjacent to a by-pass channel whereby the gaseous charge is transferred from one peripheral chamber to another and from one side to the other of an abutment, there being two of each of the specified kinds of abutment arranged in alternation around said rotor.

3. In a rotary engine and in combination with the stator and rotor members thereof, the latter having peripheral chambers separated from each other by oblique vanes, a plurality of rotary annular abutments which intersect the plane of rotation of said rotor, means for supplying an explosive mixture to said peripheral chambers on one side of an abutment, a by-pass channel at another abutment leading from one peripheral chamber to the next adjacent in the rear thereof and from one side to the other of an abutment.

4. In a rotary engine, the combination with the stator member of a rotor mounted in bearings therein and having on its rim obliquely disposed vanes forming a series of peripheral chambers which partly overlap each other, an annular abutment geared to said rotor and intersecting the path of said vanes, said abutment being provided with apertures for the passage of said vanes, and a by-pass so located as to transfer the charge in one passing peripheral chamber to the next adjacent thereto and simultaneously from one side to the other of the intersecting abutment, the transfer being timed to take place when a vane is in the act of passing through an aperture in the said abutment.

5. A rotary engine comprising a stator member, a rotor mounted for rotation in bearings therein and forming in conjunction therewith a series of peripheral chambers, a series of rotary annular abutments which intersect the path of said peripheral chambers, said abutments being disposed at equal distances apart around the rim of said rotor and being geared directly thereto, means for supplying to each chamber successively a gaseous charge on one side of an abutment, means for transferring said charge to the other side thereof and to another peripheral chamber, ignition means in position to fire the transferred charge, and an exhaust passage for the discharge of the products of combustion after the expansion thereof.

6. In a rotary engine, the combination with the stator, of a rotor mounted therein and having a piston vane; a rotary abutment of annular form; means for supplying an explosive compound to a space bounded in part by one of the curved sides of said abutment; and means for transferring the same to the opposite side thereof for explosion.

7. The combination with the stator, of a rotor mounted therein and having a piston vane; a rotary abutment of annular form disposed tangentially to said rotor; means for supplying an explosive compound to a space bounded in part by one of the curved sides of said abutment; and means for transferring the same to the opposite side thereof for explosion.

8. The combination with the stator, of a rotor mounted therein; and two ring-shaped rotary abutments each performing functions of a character different from those performed by the other.

9. The combination with the stator, of a rotor mounted therein and having a piston vane; two ring-shaped rotary abutments; and intake and exhaust means associated with one of said abutments and compression and explosion means associated with the other abutment.

10. The combination with the stator, of a rotor mounted therein; and two ring-shaped rotary abutments disposed tangentially to said rotor, each performing functions of a character different from those performed by the other.

11. The combination with the stator, of a rotor mounted therein and having a piston vane obliquely disposed on its periphery; and a rotary abutment of annular form also mounted therein for cooperation with said rotor.

12. The combination with the stator, of a rotor mounted therein and having a piston vane obliquely disposed on its periphery; and a rotary abutment of annular form also mounted in said stator and disposed tangentially to said rotor for cooperation therewith.

13. The combination with the stator, of a rotor mounted therein and having a piston vane obliquely disposed on its periphery; an abutment of annular form rotatably mounted for cooperation with said rotor; and means associated with said abutment for transferring an explosive charge from one side thereof to the other.

14. The combination with the stator, of a rotor mounted therein and having a piston vane obliquely disposed on its periphery; an abutment of annular form rotatably mounted for cooperation with said rotor; and intake and exhaust means associated with said abutment.

15. The combination with the stator, of a rotor mounted therein and having two piston vanes obliquely disposed on its periphery; an abutment of annular form rotatably mounted for cooperation with said rotor; intake and exhaust means associated with said abutment; a second abutment of annular form rotatably mounted for cooperation with said rotor; and compression and explosion means associated with said second abutment.

16. The combination with the stator, of a rotor mounted therein and having two piston vanes obliquely disposed on its periphery; an abutment of annular form rotatably mounted for cooperation with said rotor and disposed tangentially thereto; intake and exhaust means associated with said abutment; a second abutment of annular form rotatably mounted for cooperation with said rotor and disposed tangentially thereto; and compression and explosion means associated with said second abutment.

17. The combination with the stator, of a rotor mounted therein and having a piston vane obliquely disposed on its periphery; an abutment of annular form rotatably mounted in said stator; intermeshing gear teeth on said rotor and abutment; and intake and exhaust means associated with said abutment.

18. The combination with the stator, of a rotor mounted therein and having a piston vane obliquely disposed on its periphery; an abutment of annular form rotatably mounted in said stator and disposed tangentially to said rotor, said abutment and rotor having thereon intermeshing gear teeth; and intake and exhaust means associated with said abutment.

19. The combination with the stator, of a rotor mounted therein and having a piston vane obliquely disposed on its periphery; an abutment of annular form rotatably mounted in said stator; intermeshing gear teeth on said rotor and abutment; and means for transferring an explosive charge from one side to the other of said abutment.

20. The combination with the stator, of a rotor mounted therein and having a piston vane and gear teeth on its periphery; and an abutment of annular form having gear teeth which engage those on said rotor.

21. The combination with the stator, of a rotor mounted therein and having a piston vane and gear teeth on its periphery; an abutment of annular form having gear teeth which engage those on said rotor; and intake and exhaust means associated with said abutment.

22. The combination with the stator, of a rotor mounted therein and having a piston vane and gear teeth on its periphery; an abutment of annular form having gear teeth which engage those on said rotor; and means associated with said abutment for transferring an explosive charge from one side thereof to the other.

23. In a rotary engine, the combination with the rotor having an oblique piston vane and oblique gear teeth, of a rotary abutment of annular form having an aperture suitably shaped and located for the passage of said piston vane and oblique teeth engaging those on said rotor.

24. In a rotary internal combustion engine, the combination with the rotor having an oblique piston vane and oblique gear teeth, of a rotary abutment of annular form provided with an aperture suitably shaped and located for the passage of said piston vane and with gear teeth engaging those on said rotor, one side of said abutment serving for the compression of the gaseous charge and the other for the explosion thereof.

25. In a rotary internal combustion engine, the combination with the rotor having an oblique piston vane and oblique gear teeth, of two rotary abutments of annular form, each having an aperture suitably shaped and located for the passage of said piston vane and oblique teeth engaging those of said rotor, one of said abutments serving for the intake and exhaust of the explosive charge, and the other for the compression and explosion thereof.

26. In combination, a rotor having on its rim a plurality of oblique piston vanes; a plurality of annular rotary abutments crossing the rim of said rotor and having apertures for the passage of said vanes, the obliquity of the latter being such that the intersection of said abutments with the plane of said rotor is approximately at right angles to said vanes; means for admitting a gaseous charge to one side of each abutment in proximity to its intersection with a vane; and means for transferring said charge to the other side of said abutment.

27. In combination, a rotor having radial piston vanes obliquely disposed on its rim and dividing the same into a series of peripheral chambers; a plurality of rotary abutments in the form of rings which cross the rim of said rotor and have apertures for the passage of said vanes; means for admitting a gaseous charge to each of said chambers in succession, said means comprising intake passages which extend across the rim of the rotor; and means for transferring said charge from one peripheral chamber to another and from one side of each abutment to the other.

28. The combination with the stator, of a rotor mounted therein and having a piston vane and gear teeth on its periphery; and a cooperating rotary annular abutment having one or more openings therethrough for the passage of the piston vane and gear teeth thereon projecting in a direction approximately parallel to the axis of the abutment and intermeshing with the gear teeth on the rotor.

29. In a rotary engine, the combination with the rotor having an oblique piston vane and oblique gear teeth, of a rotary abutment of annular form having an aperture suitably shaped and located for the passage of said piston vane and oblique gear teeth projecting in a direction approximately parallel to the axis of the abutment and intermeshing with said gear teeth on the rotor.

30. In a rotary engine, the combination with a rotor having gear teeth at the periphery thereof, of a cooperating rotary abutment having gear teeth thereon projecting in a direction approximately parallel to the axis of the abutment and intermeshing with said gear teeth on the rotor.

31. The combination with a stator, of a rotor mounted therein and having a piston vane and gear teeth on its periphery; and a cooperating abutment rotatable in a plane approximately tangential to the periphery of said rotor and having one or more openings for the passage of the piston vane and gear teeth projecting in a direction approximately parallel to the axis of the abutment and intermeshing with the gear teeth on the rotor.

32. In a rotary engine, the combination with the rotor having on its periphery an oblique piston vane and oblique gear teeth, of a cooperating abutment rotatable in a plane approximately tangential to the periphery of said rotor and having an aperture suitably shaped and located for the passage of said piston vane and oblique gear teeth projecting in a direction approximately parallel to the axis of the abutment and intermeshing with said gear teeth on the rotor.

33. In a rotary engine, the combination with a rotor having gear teeth on its periphery, of a cooperating abutment rotatable in a plane approximately tangential to the periphery of said rotor and having gear teeth thereon projecting in a direction approximately parallel to the axis of the abutment and intermeshing with said gear teeth on the rotor.

34. The combination with the stator, of a rotor mounted therein and having on its periphery a piston vane and gear teeth; a plurality of rotary abutments of annular form each having an opening for the passage of said piston vane and gear teeth projecting in a direction approximately parallel to its axis and intermeshing with said gear teeth on the rotor; means for supplying an explosive charge to a space bounded in part by one side of each abutment for the compression of said charge between said piston vane and said abutment; and means for transferring the compressed charge to the opposite side of each abutment for explosion.

35. The combination with the stator, of a rotor mounted therein and having on its periphery gear teeth and a plurality of piston vanes; a plurality of rotary abutments of annular form and each having one or more openings for the passage of said piston vanes and gear teeth projecting in a direction approximately parallel to its axis and intermeshing with said gear teeth on the rotor; means for supplying an explosive charge to a space bounded in part by one side of an abutment for the compression of said charge between the same and one of said piston vanes; and means for transferring the compressed charge to the opposite side of said abutment for explosion.

36. The combination with the stator, of a rotor therein and having on its periphery gear teeth and two piston vanes; a plurality of rotary abutments of annular form and each having one or more openings for the passage of said piston vanes and gear teeth projecting in a direction approximately parallel to its axis and intermeshing with said gear teeth on the rotor; compression and explosion means associated with one of said abutments; and exhaust and intake means associated with the other of said abutments.

JOHN ARCHBOLD.
CHARLES PARKER.